(12) United States Patent
Kuo et al.

(10) Patent No.: US 9,789,900 B2
(45) Date of Patent: Oct. 17, 2017

(54) MODULAR STEERING SYSTEM

(71) Applicant: AUTOMOTIVE RESEARCH & TESTING CENTER, Lugong, Changhua County (TW)

(72) Inventors: Hsien-Yu Kuo, Lugong (TW); Chih-Jung Yeh, Lugong (TW)

(73) Assignee: Automotive Research & Testing Center, Lugong, Changhua County (TW)

( * ) Notice: Subject to any disclaimer, the term of this patent is extended or adjusted under 35 U.S.C. 154(b) by 0 days.

(21) Appl. No.: 14/984,494

(22) Filed: Dec. 30, 2015

(65) Prior Publication Data

US 2017/0190351 A1  Jul. 6, 2017

(51) Int. Cl.
*B62D 5/04* (2006.01)
*B62D 5/00* (2006.01)

(52) U.S. Cl.
CPC .......... *B62D 5/0409* (2013.01); *B62D 5/008* (2013.01); *B62D 5/0415* (2013.01)

(58) Field of Classification Search
CPC ..... B62D 5/0409; B62D 5/008; B62D 5/0415
USPC ...................... 180/444; 74/388 PS
See application file for complete search history.

(56) References Cited

U.S. PATENT DOCUMENTS

| | | | | |
|---|---|---|---|---|
| 4,621,701 A * | 11/1986 | Takabayashi | ............ | B62D 6/10 180/444 |
| 4,865,143 A * | 9/1989 | Hashimoto | ............ | B62D 6/10 180/443 |
| 4,986,381 A * | 1/1991 | Morishita | ............ | B62D 5/0412 180/446 |
| 5,267,625 A * | 12/1993 | Shimizu | ............ | B62D 1/166 180/443 |
| 6,655,494 B2 | 12/2003 | Menjak et al. | | |
| 6,675,929 B2 * | 1/2004 | Fujiwara | ............ | B62D 5/008 180/444 |
| 7,789,191 B2 * | 9/2010 | Deshmukh | ............ | B62D 5/0406 180/444 |
| 9,022,167 B2 | 5/2015 | Park | | |
| 2003/0150666 A1 * | 8/2003 | Ogawa | ............ | B62D 5/008 180/443 |
| 2005/0230179 A1 * | 10/2005 | Nakatsu | ............ | B62D 7/09 180/444 |
| 2007/0170787 A1 * | 7/2007 | Kuroumaru | ............ | B62D 5/0412 310/12.27 |
| 2014/0345965 A1 | 11/2014 | Ura | | |

* cited by examiner

*Primary Examiner* — Tony Winner
(74) *Attorney, Agent, or Firm* — Muncy, Geissler, Olds & Lowe, P.C.

(57) ABSTRACT

A modular steering system is adapted to be installed in a vehicle. The vehicle includes a steering column. The modular steering system includes an input unit, a first output unit, and a second output unit. The input unit includes an input shaft that extends along a first axis, that is adapted to be connected to the steering column, and that is adapted to be driven rotatably by the steering column about the first axis. The first output unit includes a first output shaft that extends along and is rotatable about a second axis parallel to the first axis. The second output unit includes a second output shaft that extends along and is rotatable about a third axis. The second axis and the third axis cooperatively define an angle therebetween.

10 Claims, 3 Drawing Sheets

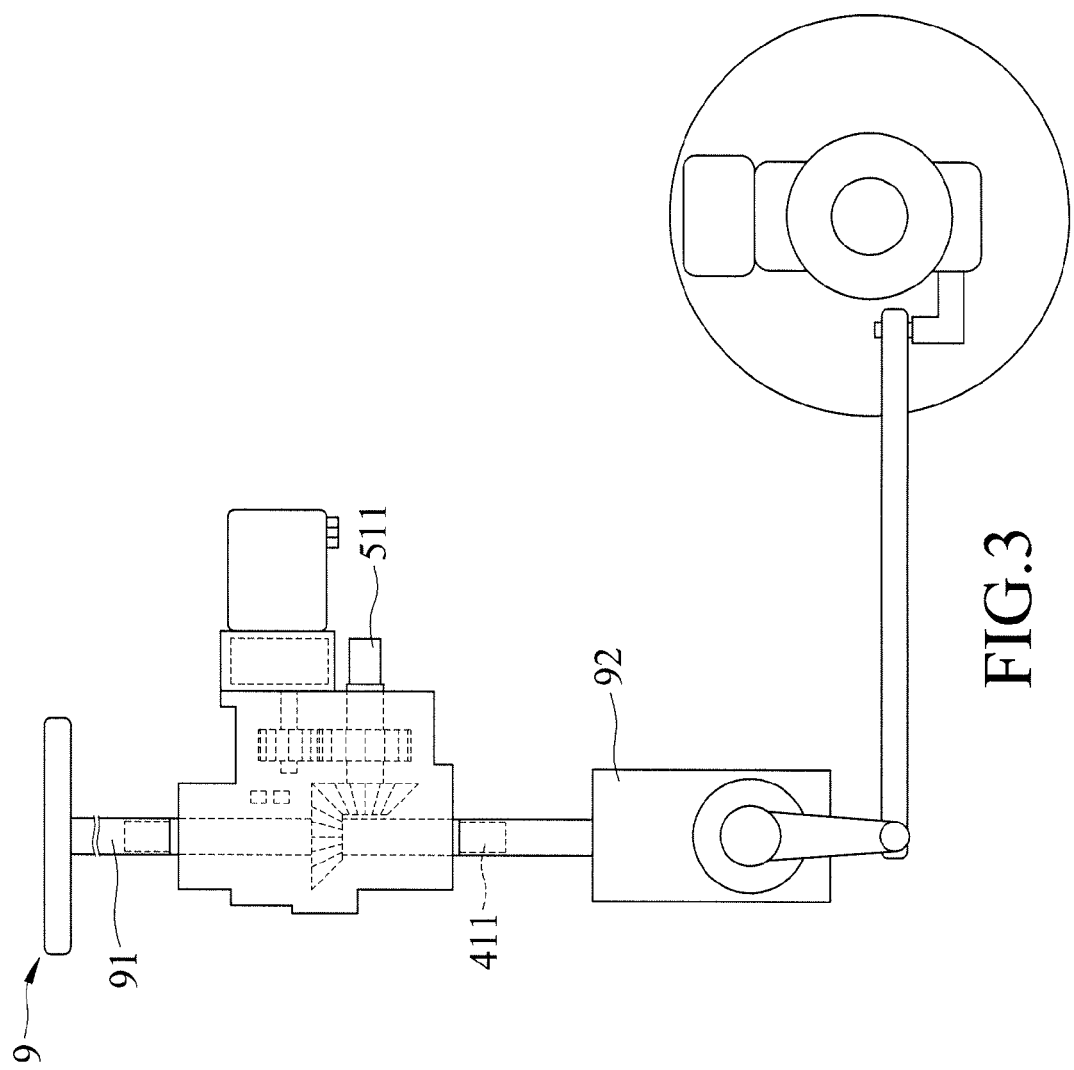

MODULAR STEERING SYSTEM

FIELD

The disclosure relates to a modular steering system, more particularly to a modular electric power-assisted steering system.

BACKGROUND

A conventional power-assisted steering system of a bus or a truck is a hydraulic power steering (HPS) system. The conventional power-assisted steering system includes a hydraulic pump driven by a motor or an engine of a vehicle to provide an assisting steering power, thereby allowing the conventional power-assisted steering system to perform the power-assisted steering function. In order for the vehicle to embody intelligent functions, such as automatic driving system, and to overcome drawbacks of the abovementioned conventional power-assisted steering system, such as low energy efficiency and inability to steer the vehicle automatically, a product which combines an electric power steering (EPS) system and a hydraulic steering gear is widely applied in heavy trucks.

Conventional buses can be classified into three types according to weight: full-size buses, midibuses, and minibuses. A full-size bus usually has a long front overhang, a minibus usually has a short front overhang, and a midibus may either have a long front overhang or a short front overhang. The EPS system may replace the HPS system completely and be equipped in the midibuses and the minibuses so as to embody the intelligent functions and decrease costs of manufacturing and maintaining.

For the full-size bus having a long front overhang, a gearbox with a bevel gear set is connected to a steering column, and transfers the rotational motion of a steering wheel through an intermediate shaft to a steering gear mounted behind the steering column to steer the vehicle.

For the vehicle having a short front overhang, a steering gear is mounted below a steering column and is directly connected to the steering column. The rotational motion of a steering wheel is transferred directly to the steering gear to steer the vehicle.

According to the above description, different types of vehicles may have different ways of connection between the steering column and the steering gear with different elements linked therebetween, thereby resulting in a complicated manufacturing process and a relatively high cost.

SUMMARY

Therefore, the object of the disclosure is to provide a modular steering system that can alleviate at least one of the drawbacks of the prior arts.

Accordingly, a modular steering system of the present disclosure is adapted to be installed in a vehicle. The vehicle includes a steering column. The modular steering system includes an input unit, a first output unit, and a second output unit. The input unit includes an input shaft that extends along a first axis, that is adapted to be connected to the steering column, and that is adapted to be driven rotatably by the steering column about the first axis. The first output unit includes a first output shaft that extends along and is rotatable about a second axis parallel to the first axis. The second output unit includes a second output shaft that extends along and is rotatable about a third axis. The second axis and the third axis cooperatively define an angle therebetween.

BRIEF DESCRIPTION OF THE DRAWINGS

Other features and advantages of the disclosure will become apparent in the following detailed description of the embodiment with reference to the accompanying drawings, of which:

FIG. 3 is a schematic side view of the embodiment mounted in a vehicle which has a short front overhang.

DETAILED DESCRIPTION

Figure 1:
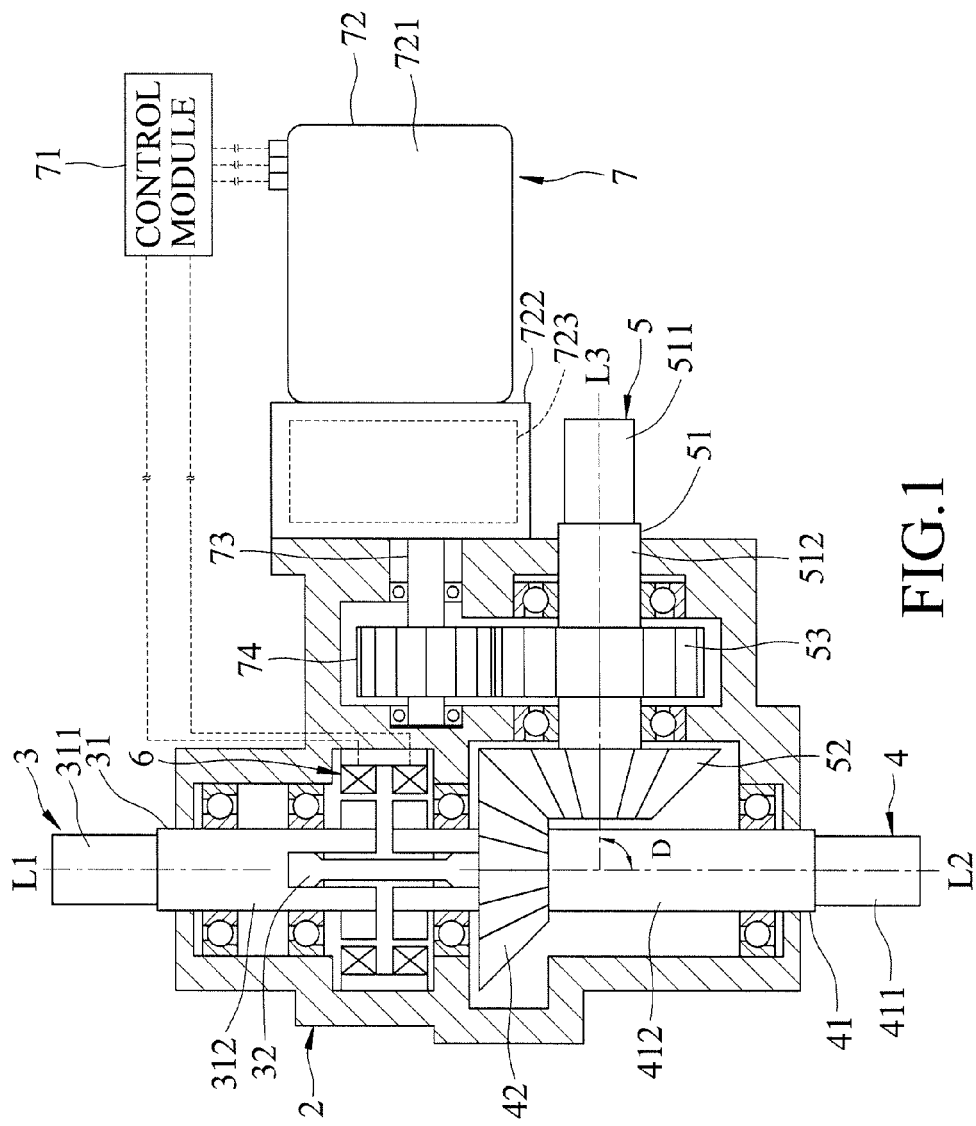
FIG. 1 is a partly sectional view of an embodiment of a modular steering system according to the disclosure.
Figure 2:
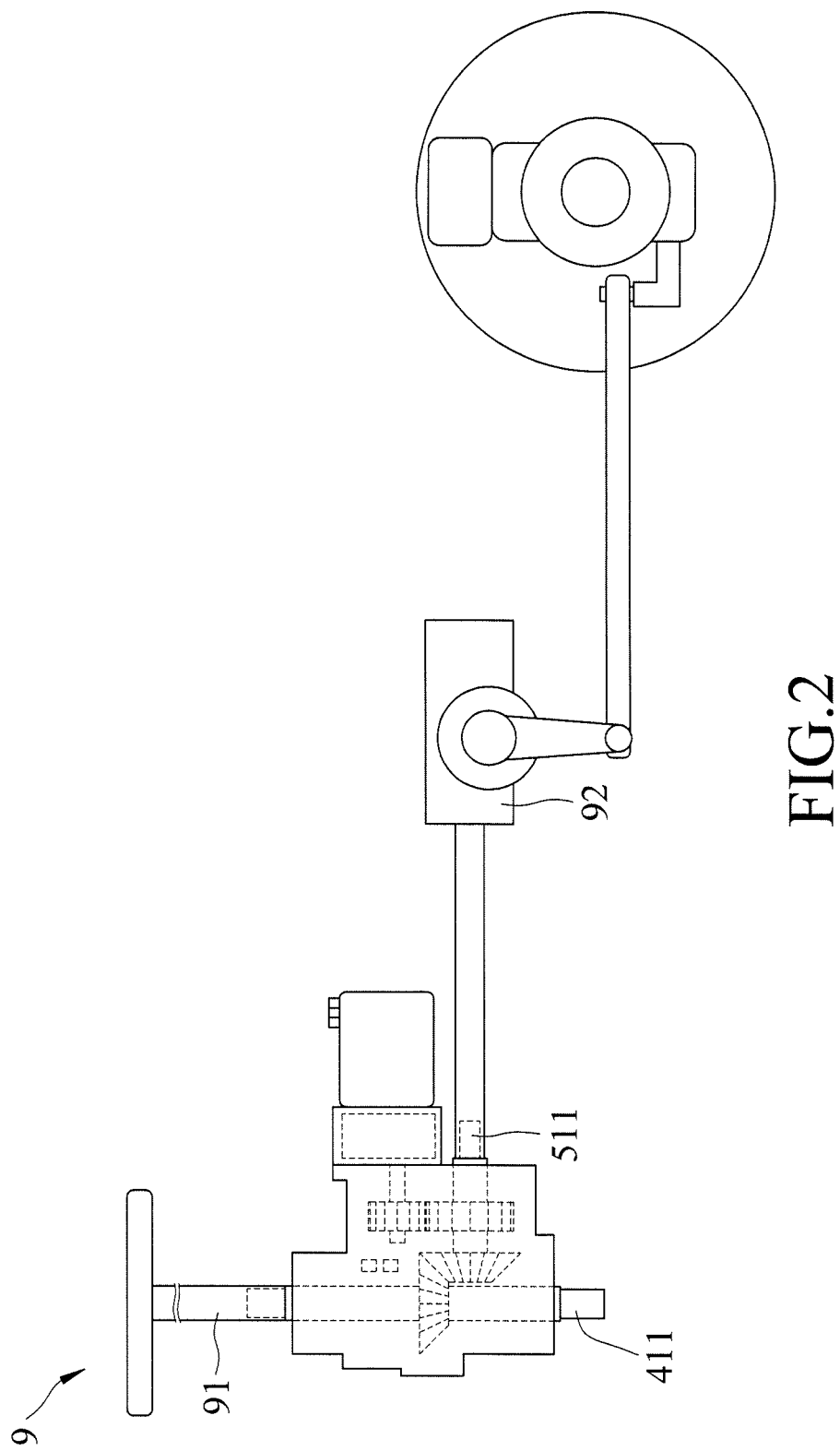
FIG. 2 is a schematic side view of the embodiment mounted in a vehicle which has a long front overhang.

As shown in FIGS. 1 to 3, the embodiment of a modular steering system according to the present disclosure is adapted to be installed in a vehicle 9. The vehicle 9 includes a steering column 91 and a steering gear 92. The modular steering system includes a housing 2, an input unit 3, a first output unit 4, a second output unit 5, a torque sensing unit 6, and a power assisting unit 7.

The input unit 3 includes an input shaft 31 that extends along a first axis (L1), and a flexible member 32 connected between the input shaft 31 and the first output unit 4.

The input shaft 31 is adapted to be connected to the steering column 91, and is adapted to be driven rotatably by the steering column 91 about the first axis (L1).

The input shaft 31 has an installing section 311 that is located outside of the housing 2 for being connected to and driven rotatably by the steering column 91, and an extending section 312 that is opposite to the installing section 311, that extends into the housing 2, and that is connected to the flexible member 32.

The first output unit 4 includes a first output shaft 41 and a first bevel gear 42 co-rotatably connected to the first output shaft 41.

The first output shaft 41 extends along a second axis (L2) parallel to the first axis (L1), and is driven rotatably by the input shaft 31 about the second axis (L2). In this embodiment, the flexible member 32 is connected between the input shaft 31 and the first output shaft 41.

The first output shaft 41 has an installing segment 411 located outside of the housing 2, and an extending segment 412 opposite to the installing segment 411, extending into the housing 2, and connected to the first bevel gear 42 and the flexible member 32.

The second output unit 5 includes a second output shaft 51 that extends along a third axis (L3) and that is driven rotatably by the input shaft 31 about the third axis (L3), a second bevel gear 52 that is co-rotatably connected to the second output shaft 51 and that meshes with the first bevel gear 42, and a coupling gear 53 that is co-rotatably connected to the second output shaft 51. The second axis (L2) and the third axis (L3) cooperatively define an angle (D) therebetween. In this embodiment, the first axis (L1) and the second axis (L2) are collinear, and the angle (D) between the second and third axes (L2, L3) is a right angle.

The second output shaft 51 has an installing portion 511 located outside of the housing 2, and an extending portion 512 opposite to the installing portion 511, extending into the housing 2, and connected to the second bevel gear 52 and the coupling gear 53.

The torque sensing unit 6 is connected to the input unit 3 and the first output unit 4 for sensing a torque input by the steering column 91. In this embodiment, when the input shaft 31 is driven to rotate by the steering column 91, a rotational displacement of the input shaft 31 relative to the first output shaft 41 is generated by a flexible twisted deformation of the flexible member 32 so as to sense the input torque of the steering column 91.

The power assisting unit 7 is electrically connected to the torque sensing unit 6 for simultaneously driving the first output shaft 41 and the second output shaft 51 according to the torque input by the steering column 91. The power assisting unit 7 includes a control module 71 electrically connected to the torque sensing unit 6, a motor module 72 electrically connected to the control module 71, a power assisting shaft 73 driven rotatably by the motor module 72, and a power assisting gear 74 co-rotatably connected to the power assisting shaft 73 and meshing with the coupling gear 53.

The motor module 72 includes a motor 721 electrically connected to the control module 71, and a speed reduction mechanism 722 disposed between the motor 721 and the power assisting shaft 73. The speed reduction mechanism 722 includes a speed reduction gear unit 723.

In operation, the input shaft 31 is first driven to rotate by the steering column 91, thereby driving rotation of the first output shaft 41 and the first bevel gear 42 via the flexible member 32. Meanwhile, the first bevel gear 42 drives rotation of the second bevel gear 52 and the second output shaft 51. At the same moment, the control module 71 receives the torque signal generated by the torque sensing unit 6 to control the motor 721. The power assisting shaft 73 and the power assisting gear 74 are then driven to rotate by the speed reduction gear unit 723 of the speed reduction mechanism 722, so that an increased torque enhanced by the speed reduction gear unit 723 can be delivered to the coupling gear 53 via the power assisting shaft 73 and the power assisting gear 74 to offer assisting torque for both the first output shaft 41 and the second output shaft 51.

In other words, the first output shaft 41 and the second output shaft 51 which extend in different directions can be driven simultaneously by the input shaft 31 and can receive the assisting torque simultaneously from the power assisting unit 7.

Since one of the installing segment 411 of the first output shaft 41 and the installing portion 511 of the second output shaft 51 is adapted to be connected to the steering gear 92 of the vehicle 9, the modular steering system of the disclosure is suitable for application in any of the vehicles 9 having a long front overhang (see FIG. 2) or a short front overhang (see FIG. 3), in which the arrangement of the steering column 91 and the steering gear 92 are different, such that the manufacturing process of the vehicle 9 can be simplified and that the manufacturing cost of the vehicle 9 can be reduced.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A modular steering system adapted to be installed in a vehicle, the vehicle including a steering column, said modular steering system comprising:
    an input unit including an input shaft that extends along a first axis, that is adapted to be connected to the steering column, and that is adapted to be driven rotatably by the steering column about the first axis;
    a first output unit including a first output shaft that extends along and is rotatable about a second axis coaxial or collinear to the first axis; and
    a second output unit including a second output shaft that extends along and is rotatable about a third axis, the second axis and the third axis cooperatively defining an angle therebetween.

2. The modular steering system as claimed in claim 1, further comprising a power assisting unit for simultaneously driving said first output shaft and said second output shaft according to a torque input by the steering column.

3. The modular steering system as claimed in claim 2, wherein:
    said input unit further includes a flexible member connected between said input shaft and said first output shaft;
    said first output unit further includes a first bevel gear co-rotatably connected to said first output shaft; and
    said second output unit further includes a second bevel gear co-rotatably connected to said second output shaft and meshing with said first bevel gear.

4. The modular steering system as claimed in claim 3, further comprising a torque sensing unit electrically connected to said power assisting unit, and connected to said input unit and said first output unit for sensing the torque input by the steering column.

5. The modular steering system as claimed in claim 4, wherein said power assisting unit includes a control module electrically connected to said torque sensing unit, a motor module electrically connected to said control module, a power assisting shaft driven rotatably by said motor module, and a power assisting gear co-rotatably connected to said power assisting shaft, said second output unit further including a coupling gear that is co-rotatably connected to said second output shaft and that meshes with said power assisting gear.

6. The modular steering system as claimed in claim 5, further comprising a housing, said input shaft having an installing section that is located outside of said housing for being connected to and driven rotatably by the steering column, and an extending section that is opposite to said installing section, that extends into said housing, and that is connected to said flexible member.

7. The modular steering system as claimed in claim 6, wherein:
    said first output shaft has an installing segment located outside of said housing, and an extending segment opposite to said installing segment, extending into said housing, and connected to said first bevel gear and said flexible member;
    said second output shaft has an installing portion located outside of said housing, and an extending portion opposite to said installing portion, extending into said housing, and connected to said second bevel gear and said coupling gear; and
    one of said installing segment of said first output shaft and said installing portion of said second output shaft is adapted to be connected to a steering gear of the vehicle.

8. The modular steering system as claimed in claim 7, wherein the angle between the second and third axes is a right angle.

9. The modular steering system as claimed in claim 5, wherein said motor module includes a motor electrically connected to said control module, and a speed reduction mechanism disposed between said motor and said power assisting shaft.

10. The modular steering system as claimed in claim 9, wherein said speed reduction mechanism includes a speed reduction gear unit.

\* \* \* \* \*